United States Patent [19]

Chu

[11] Patent Number: 4,864,727

[45] Date of Patent: Sep. 12, 1989

[54] PNEUMATIC TOOL HOLDER

[76] Inventor: George Chu, P.O. Box 10160, Taipei, Taiwan

[21] Appl. No.: 194,528

[22] Filed: May 16, 1988

[51] Int. Cl.⁴ .................................................. B23B 29/08
[52] U.S. Cl. .................................... 30/272.1; 30/392; 30/393; 30/394; 279/7; 279/8; 279/83
[58] Field of Search ...................... 30/272 R, 293, 392, 30/393, 394, 342, 329, 332, 340; 173/114, 116; 279/1 A, 1 Q, 83, 8, 7

[56] References Cited

U.S. PATENT DOCUMENTS

| | | | |
|---|---|---|---|
| 3,260,289 | 7/1966 | Whitten, Jr. | 30/392 |
| 3,741,317 | 6/1973 | Unterschweiger et al. | 173/116 X |
| 3,781,025 | 12/1973 | D'Angelo | 30/392 X |
| 3,927,893 | 12/1975 | Dillon et al. | 30/392 |
| 4,064,949 | 12/1977 | Chromy | 173/116 X |
| 4,240,204 | 12/1980 | Walton, II et al. | 30/393 |
| 4,727,941 | 3/1988 | Fulton | 173/114 |
| 4,786,062 | 11/1988 | Schneider | 279/83 |

FOREIGN PATENT DOCUMENTS 2034245  6/1980  United Kingdom .............. 279/1 A

Primary Examiner—Donald R. Schran
Assistant Examiner—Yu Chi Lin

[57] ABSTRACT

A pneumatic tool holder includes: a handle having a piston pneumatically driven within a cylinder in the handle, a sliding sleeve secured to the handle having a longitudinal polygonal hole formed in the sleeve and a tool clamping member generally formed as a polygonal block to be reciprocatively stably guided in the polygonal hole of the sleeve having a pair of set screws transversely inserted through the block to firmly clamp a tool shank as inserted into the block and an air passage provided in the handle and in between the tool clamping member and the sleeve for directing air stream from inside the cylinder to cool down the operating tool as held in the clamping member.

4 Claims, 3 Drawing Sheets

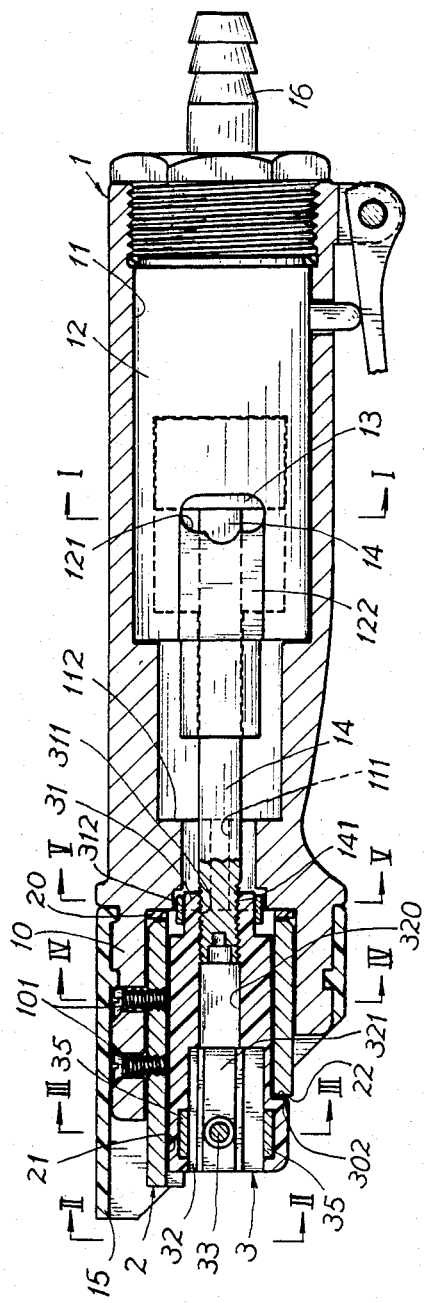
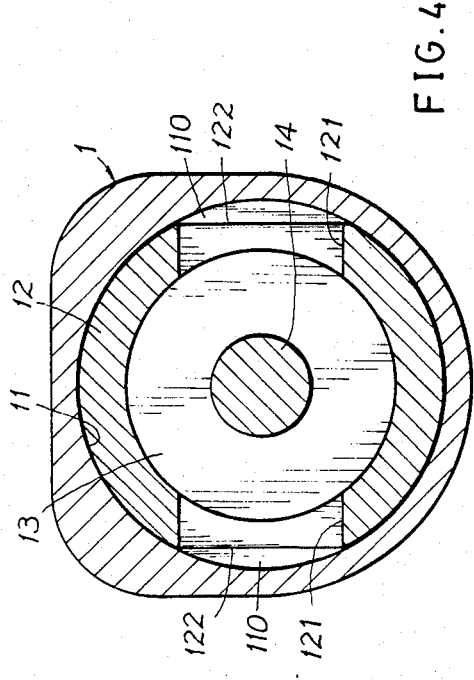
FIG. 3
FIG. 4

PNEUMATIC TOOL HOLDER

BACKGROUND OF THE INVENTION

German patent DE 2939896 (patent specification enclosed herewith as a reference) disclosed a pneumatic tool holder having a tool such as a file kept on a tool holder (5) by clamping screws (8) and reciprocatively held on a guide piece (10) for mechanical processing use. However, such a conventional tool holder has the following drawbacks:

1. The clamping screws (8) for clamping the tool in the holder (5) may be easily loosened due to serious vibration during processing operation since the screws (8) are not protectively encased in an elastomer, especially after a long time service.

2. Once a T-shaped extension (5e) of the holder (5) is slidably engaged with a pair of flanges (10a) of the small guide piece (10) so that the tool (6) as inserted in the holder (5) may easily be twisted, deformed or even be broken during a filing operation, as bearing against a twisting or biasing force between a working piece and the small guide piece (10).

3. A frictional heat exerting during a filing operation by the file (6) is cooled by an environmental air, thereby resulting in a poorer cooling effect than a forced-draft air cooling.

The present inventor has found the drawbacks of a conventional pneumatic tool holder and invented the present tool holder having better stability and cooling effect.

SUMMARY OF THE INVENTION

The object of the present invention is to provide a pneumatic tool holder including a handle means having a piston pneumatically driven within a cylinder in the handle means, a sliding sleeve having a longitudinal polygonal hole formed in the sleeve and secured to a front portion of the handle means, and a tool clamping means reciprocatively and stably guided in the sleeve having a pair of set screws tightly transversely clamping a tool in a socket of the clamping means wherein an air passage is formed between the tool clamping means and the sliding sleeve to direct the air stream released from the cylinder towards the tool for cooling the same.

BRIEF DESCRIPTION OF THE DRAWINGS

FIG. 3 is a front-view sectional drawing of the present invention.

FIG. 4 is a cross-sectional drawing of the present invention when viewed from I—I direction of FIG. 3.

DETAILED DESCRIPTION

Figure 1:
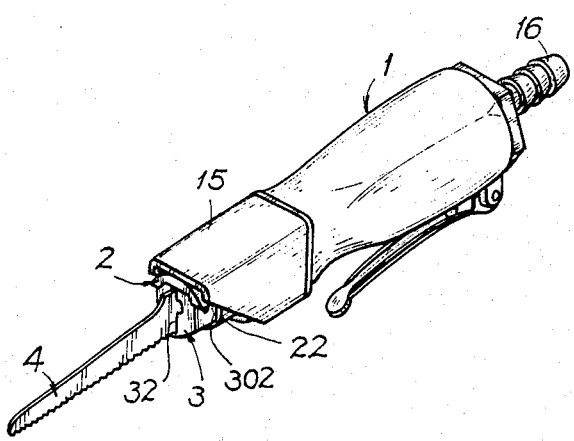
FIG. 1 is a perspective view of the present invention when assembled.

As shown in the figures, the present invention comprises: a handle means 1, a sliding sleeve 2, and a tool clamping means 3 for holding a tool 4 such as: a saw blade, a file or other pneumatic tools.

The handle means 1 includes: a cylindrical bore 11 for inserting a pneumatic cylinder 12 therein, a piston 13 operatively driven within the cylinder 12 having a piston rod 14 protruding frontwardly from the piston, a protective cover 15 secured on a bracket 10 formed on a front portion of the handle means, and a tail hose connector 16 for connecting an air hose (not shown).

As shown in FIGS. 3 and 4, the cylinder 12 is transersely formed with an air port 121 for releasing "waste" air during pneumatic pumping operation therethrough and a pair of longitudinal secant flat portions 122 each perpendicular to the port 121 and protruding frontwardly from the port 121 to define a longitudinal meniscus air passage 110 between the secant flat portion 122 and a cylindrical wall of the bore 11. A pair of contracting air passages 111 are formed in a front end plate 112 of the handle means 1 to aerially communicate with the pair of longitudinal meniscus passages 110.

Figure 7:
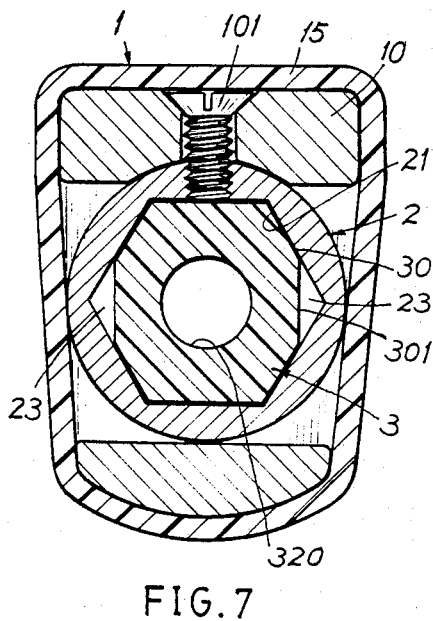
FIG. 7 is a cross-sectional drawing of the present invention when viewed from IV—IV direction of FIG. 3.

The sliding sleeve 2 is secured to the bracket 10 of the handle means 1 by two screws 101 as packed by a packing ring 20, and is formed with a longitudinal polygonal hole 21 preferably a hexagonal hole as shown in FIG. 7. The front portion of the sleeve 2 is formed a recess portion 22.

Figure 2:
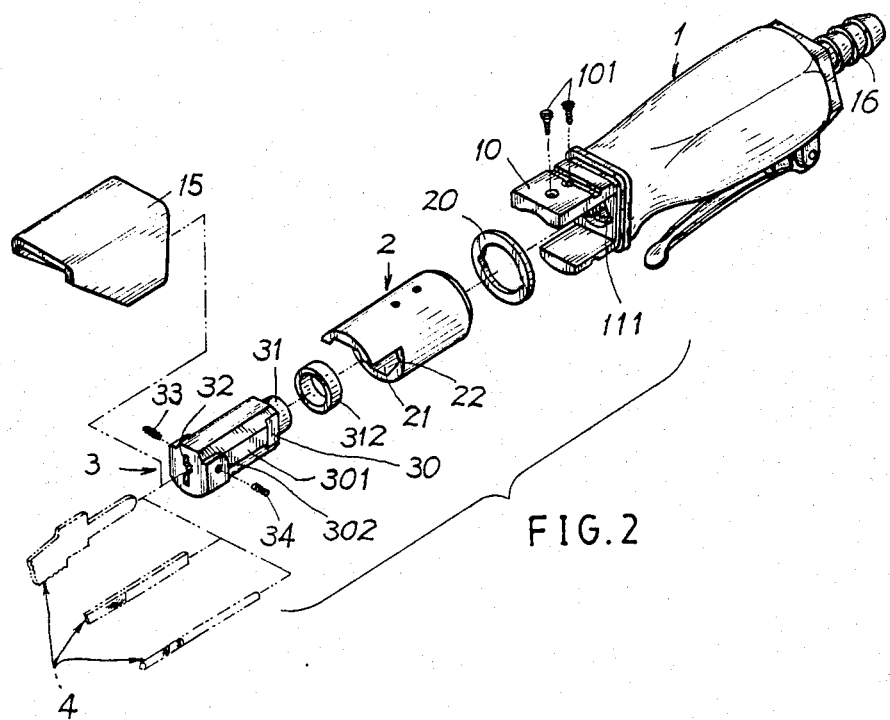
FIG. 2 is an illustration showing the elements in construction of the present invention.
Figure 5:
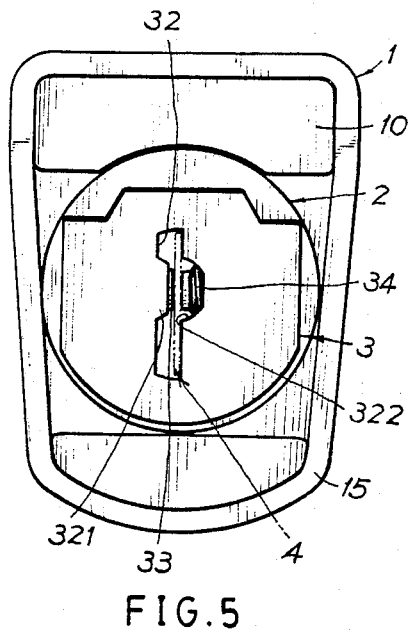
FIG. 5 is a cross-sectional drawing of the present invention when viewed from II—II direction of FIG. 3.
Figure 6:
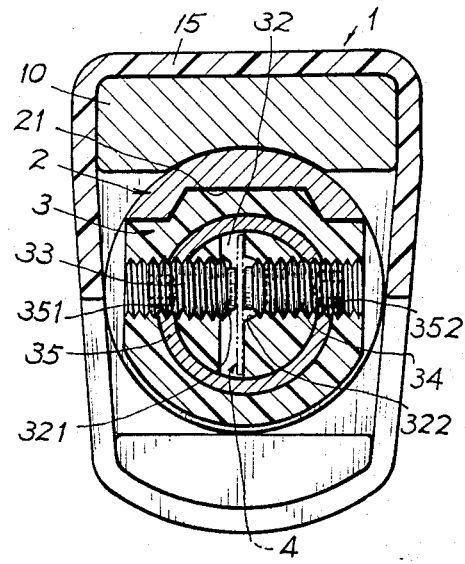
FIG. 6 is a cross-sectional drawing of the present invention when viewed from III—III direction of FIG. 3.
Figure 8:
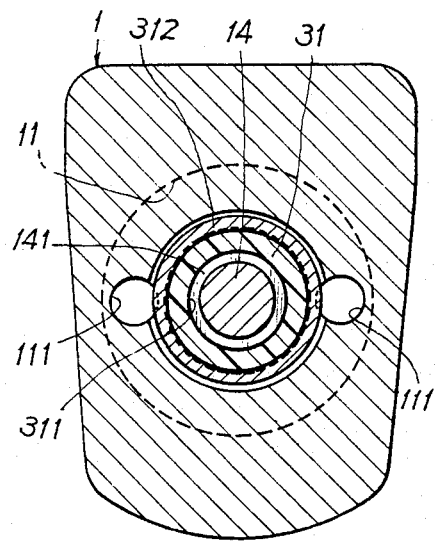
FIG. 8 is a cross-sectional drawing of the present invention when viewed from V—V direction of FIG. 3.

The tool clamping means 3 includes: a longitudinal polygonal block 30 made of elastomer materials reciprocatively engageable with the polygonal hole 21 of the sleeve 2 having two longitudinal secant flat surfaces 301 formed on two opposite sides of the block 30, each secant surface 301 forming a longitudinal triangle air passage 23 with an angle of the polygonal hole 21 of the sleeve as shown in FIG. 7 aerially communicated with each contracting air passage 111 as shown in FIGS. 3 and 2; a rear stem 31 formed on a rear portion of the block 3 having a female-threaded hole 311 formed therein for connecting a male-threaded front end 141 of the piston rod 14 and having a metallic fastening ring 312 circumferentially holding the stem 31 in the ring for reinforcing the connection of the rear stem 31 and the piston rod 14 as shown in FIG. 8; a longitudinal tool socket 32 formed in a front portion of the block 30 (FIGS. 5 and 6) having a generally rectangular slot formed at a front portion of the socket 32 for holding a shank portion of tool 4 and having a cylindrical hole 320 protruding rearwardly from the rectangular slot to hold a tail portion of the tool 4; a left set screw 33 transversely inserted in a left side wall of the block 30 and protruding rightwardly through a longitudinal convex portion 321 formed on a left side of the rectangular slot of the tool socket 32; a right set screw 34 transverely inserted in a right side wall of the block 30 and protruding leftwardly through a longitudinal recess portion 322 opposite to the convex portion 321 operatively clamping the tool shank in commensuration with the left screw 33; and a metallic fastening collar 35 circumferentially disposed around the rectangular slot of the socket 32 and confining the general rectangular slot of the longitudinal tool socket 32 within the collar 35 having a pair of screw holes 351, 352 respectively engaged with the two set screws 33, 34 for firmly securing the two screws 33, 34 within the elastomer block 30 as shown in FIG. 6.

Two shoulder extensions 302 each inserted with a set screw 33 or 34 are respectively formed on two opposite sides of the block 30 which are retractively received in the recess portion 22 of the sleeve 2 as shown in FIGS. 1 and 3. The sleeve 2 may be made of materials of powder metallurgy. The collar 35 can be pre-embedded in the block 30 before being integrally molded. The fastening collar 35 is embedded in between an inner portion of the polygonal block 30 adjacent to the rectangular slot 32 and an outer portion of the polygonal block 30.

The present invention has the following advantages superior to a conventional pneumatic tool holder:

1. The tool shank is clamped in the socket 32 by two set screws 33, 34 which are tightly confined in the elastomer block 30 as retained by the fastening collar 35, thereby preventing loosening of the screws due to frequent vibrations.

2. The clamping means 3 is completely reciprocated within the sleeve hole 21 for stably guiding the tool 4 and tool clamping means 3 within the sleeve 2 for preventing deformation or breakage of the tool 4.

3. A forced-draft cooling air is directed through the longitudinal meniscus passages 110, contracting passages 111, and triangle passages 23 towards the tool 4 as held in the block 30 to prolong the service life of the tool.

4. A rear metallic fastening ring 312 is provided to firmly secure the connection of the elastomer stem 31 with the piston rod 14.

5. Either a flat tool shank or a round tool shank can be secured in the slot by a "buffer" space between the convex portion 321 and the recess portion 322. The "buffer" space therebetween may also serve to retain a deformed tool shank.

I claim:

1. A pneumatic tool holder comprising:
a handle means having a cylindrical bore for receiving a pneumatic cylinder therein, a piston with a piston rod protruding frontwardly from said piston operatively driven in said cylinder;
a sliding sleeve secured to a front portion of said handle means; and
a tool clamping means made of elastomer material having a rear stem connected with said piston rod and including: a longitudinal polygonal block reciprocatively engageable with a polygonal hole formed inside said sliding sleeve, a rear stem formed on a rear portion of said block connected with said piston rod, and a longitudinal tool socket formed in a front portion of said block having a generally rectangular slot formed in a front portion of said socket for holding a shank portion of the tool and having a rear cylindrical hole protruding rearwardly from said rectangular slot for holding a tail portion of the tool, the improvement which comprises said tool clamping means including: a left set screw transversely inserted in a left side wall of said block and protruding rightwardly through a longitudinal convex portion formed on a left side wall of said rectangular slot of said tool socket, a right set screw transversely inserted in a right side wall of said block and protruding leftwardly through a longitudinal recess portion opposite to said convex portion to tightly clamp a tool shank in commensuration with the left set screw, and a metallic fastening collar circumferentially disposed around said tool socket having a pair of screw holes formed through the collar respectively engaged with the two set screws for tightly securing said two screws within said elastomer block, said metallic fastening collar confining said generally rectangular slot of said longitudinal tool socket and an inner portion of said polygonal block within said fastening collar, and said fastening collar embedded in between the inner portion of said polygonal block adjacent to said rectangular slot and an outer portion of said polygonal block.

2. A tool holder according to claim 1, wherein said cylinder in said bore of said handle means includes a pair of longitudinal secant flat portions formed on two sides of the cylinder forming two longitudinal meniscus air passages aerially communicated with an air port of the cylinder; and wherein said handle means includes a pair of contracting air passages aerially communicated with the two meniscus air passages.

3. A tool holder according to claim 1, wherein said block of said tool clamping means includes two longitudinal secant flat surfaces formed on two opposite sides of said block, each said flat surface forming a triangle air passage with an angle of said polygonal hole of said sliding sleeve, aerially communicated with each said contracting air passage of said handle means.

4. A tool holder according to claim 1, wherein said block includes a pair of shoulder extensions formed on two opposite sides of said block adapted for the insertion of said two set screws, said two shoulder extensions retractively received within a recess portion formed in said sliding sleeve.

* * * * *